March 4, 1930.    M. PRÉTOT ET AL    1,749,260
DEVICE FOR REMOVING SOLID PARTICLES FROM FLUE GASES
Filed Dec. 5, 1927
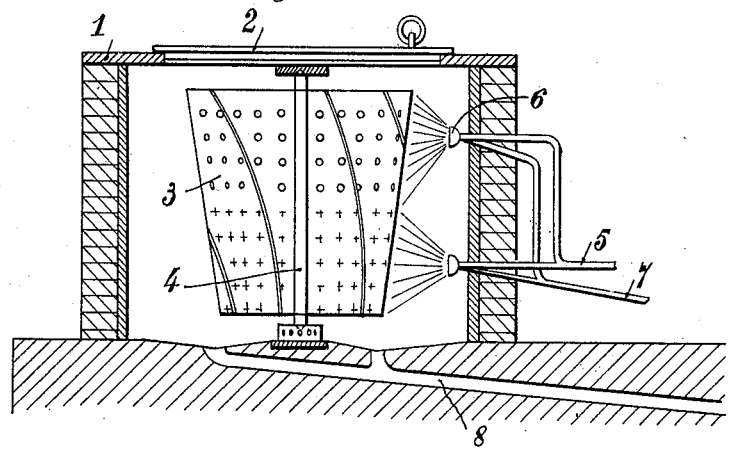
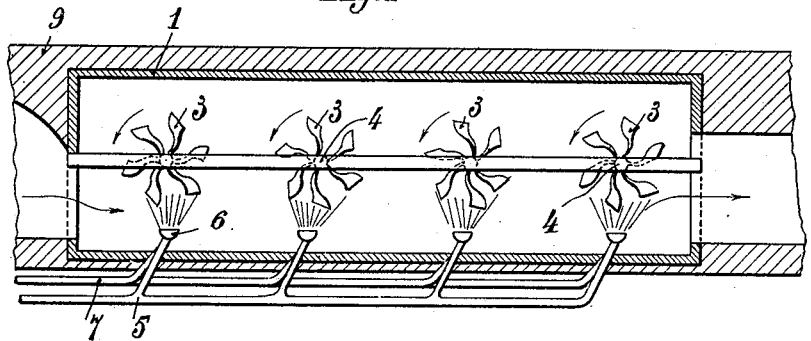
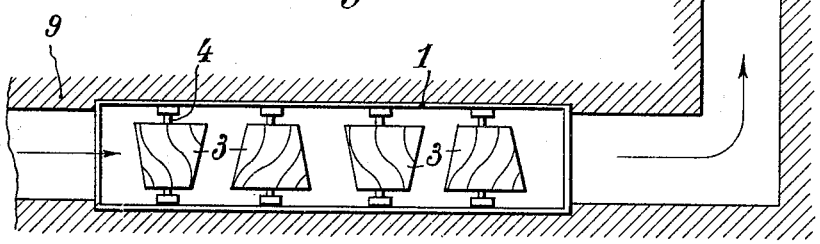

Patented Mar. 4, 1930

1,749,260

UNITED STATES PATENT OFFICE

MARCEL PRÉTOT AND FRANÇOIS ULLMANN, OF MULHOUSE, FRANCE

DEVICE FOR REMOVING SOLID PARTICLES FROM FLUE GASES

Application filed December 5, 1927, Serial No. 237,926, and in France December 4, 1926.

The present invention relates to a device for removing the soot and solid particles from the flue gases of boilers or other heating plants.

One of the objects of the invention is to provide a very simple device of the above mentioned character which can be manufactured at low cost and is easy to keep in repair and to provide a device which will not interfere with the draft and which will operate very effectively in removing the soot and solid particles. For carrying out this object the invention provides devices for bringing the flue gases intimately into contact with a washing liquid fed by compressed air. In order to obtain an intimate contact between the liquid and gases, the liquid is projected in the form of a spray against the vanes of one or more turbines which are rotatably mounted at a suitable position in the flue, the said vanes having a large area and being perforated for the passage of the liquid spray and gases. In order not to interfere with the natural draft of the heating plant, the washing liquid is projected by compressed air tangentially onto the blades in the same direction in which the flue gases are flowing, the turbines being so mounted that the direction of rotation of none of their blades will be opposed to the direction of the flue gases.

An arrangement of the device is illustrated by way of example, on the accompanying drawings, in which:

Fig. 1 is a transverse section, on a large scale, of the device showing only one turbine.

Fig. 2 is a plan view, partly in section, of the device provided with several turbines.

Fig. 3 is a side view thereof.

At a suitable position in the flue there is provided a box 1 in which the devices embodying the invention are mounted, said box being provided with a cover 2, whereby access can be readily had to the devices for cleaning or repairing them. A plurality of turbines 3 are mounted in this box on spindles 4 which are freely rotatable, the turbine blades having a large number of perforations. The cleaning fluid is supplied through a conduit 5, which has a number of branches corresponding to the number of turbines, each branch terminating in a spraying nozzle 6. Compressed air is fed through a conduit 7 and branches to the spraying nozzle and causes the cleaning fluid to be projected tangentially against the turbine blades in the form of a finely divided spray. The flue gases enter box 1 through a gradually restricted or tapering opening, as indicated in Fig. 2 and thus have their velocity accelerated. It will be noted that the axes of the turbines are mounted at one side of the box openings, and thus the blades of the turbines against which the gases impinge are moving in the same direction as the gases with the result that the draft of the furnace is not affected. The cleaning liquid after absorbing the impurities of the gases fall to the bottom and are led off through a conduit 8. The turbines 3 are preferably of trunconical shape and adjacent turbines are mounted in reversed positions, as indicated in Fig. 3. The turbines tend to project towards their larger end, under centrifugal force, a part of the washing liquid, which is thus projected against the two walls.

The drawings illustrate the axes of the turbines extending vertically, but it will be obvious that the axes may be arranged horizontally. It is also obvious that a fan might be provided to increase the draft.

What we claim is:

1. In a heating plant, a device mounted at a suitable point in a flue for removing the solid particles from the flue gases, comprising, in combination, a turbine having a plurality of blades formed with many perforations, means for projecting by compressed air a cleaning fluid against the blades of said turbine in a direction to cause the turbine to rotate, said turbine being so mounted with reference to the stream of gases that only those blades moving in the direction of the gases come in contact with said gases.

2. In a heating plant, a device mounted in a chamber between the combustion space and the chimney for removing the solid particles from the flue gases, comprising, in combination, a plurality of turbines having perforated blades mounted for free rotation in said chamber, and means for projecting by compressed air a cleaning fluid against the blades of said turbines in a tangential direction, whereby said turbines are caused to rotate in the same direction, said turbines being so mounted with reference to the stream of gases that only those blades moving in the direction of the gases come in contact therewith, the entrance opening into said chamber being contracted so as to increase the velocity of the gases.

In testimony whereof we affix our signatures.

MARCEL PRÉTOT.
FRANÇOIS ULLMANN.